United States Patent [19]
> Dryer

[11] 3,888,496
[45] June 10, 1975

[54] CAPTIVE SEAL WITH RETAINERS LOADED AGAINST NON-PARALLEL SURFACES

[75] Inventor: Eldon O. Dryer, Malibu, Calif.

[73] Assignee: W. S. Shamban & Co., West Los Angeles, Calif.

[22] Filed: May 3, 1973

[21] Appl. No.: 357,068

[52] U.S. Cl. .............................. 277/117; 277/188
[51] Int. Cl. ............................................. F16l 21/02
[58] Field of Search ........ 277/117, 188, 190, 167.5, 277/189, 181, 186

[56] References Cited
UNITED STATES PATENTS

| | | | |
|---|---|---|---|
| 2,330,197 | 9/1943 | Allen et al. | 277/188 |
| 3,094,337 | 6/1963 | Pippert et al. | 277/188 |
| 3,279,805 | 10/1966 | Quinson | 277/188 |
| 3,436,085 | 4/1969 | Polk | 277/117 |
| 3,594,022 | 7/1971 | Woodson | 277/188 |
| 3,704,021 | 11/1972 | Barbarin et al. | 277/188 |
| 3,717,293 | 2/1973 | Traub et al. | 277/143 |

FOREIGN PATENTS OR APPLICATIONS

| | | | |
|---|---|---|---|
| 779,763 | 7/1957 | United Kingdom | 277/188 |

Primary Examiner—Samuel B. Rothberg
Assistant Examiner—John W. Shepperd
Attorney, Agent, or Firm—George F. Smyth

[57] ABSTRACT

A captive sealing construction comprising a completely enclosed seal cavity and a seal ring of deformable sealing material in the cavity. The seal cavity is defined in part by first and second members which are relatively movable to reduce the volume of the seal cavity and to compressively load and deform the seal ring so that the seal ring completely fills the cavity. The members define one or more gaps and each of these gaps is closed by a retainer which is tightly loaded against non-parallel regions of the wall of the seal cavity.

4 Claims, 10 Drawing Figures

3,888,496

CAPTIVE SEAL WITH RETAINERS LOADED AGAINST NON-PARALLEL SURFACES

BACKGROUND OF THE INVENTION

A captive seal is one in which a sealing material is completely confined and compressively loaded beyond its yield point. The sealing material completely fills the seal cavity in which it is positioned. The compressive loading is sufficient to cause the sealing material to flow into the minute crevices and surface irregularities of the wall of the cavity to form a tight seal. One advantage of captive seals is that the surfaces which confine the seal need not have a good finish. Captive seal constructions are shown, for example, in U.S. Pat. Nos. 3,572,735 and 3,594,022.

In a typical captive seal construction, a seal cavity is at least partially defined by two members which may be, for example, flanged pipes. A seal ring of deformable sealing material is positioned in the cavity. The members define one or more gaps therebetween leading into the seal cavity. These gaps must be closed to completely close the seal cavity and to prevent the seal ring from extruding out through these gaps.

The gaps can be closed by retainers. The retainers are a very important part of a captive seal because they must tightly close the gap to prevent the seal ring from extruding and thereby causing failure of the seal. The retainers should not be intricately shaped as this significantly increases the cost of the captive seal.

SUMMARY OF THE INVENTION

The present invention provides for tightly closing the gaps of the seal cavity to prevent extrusion of the seal ring. This is accomplished by appropriately configuring the surfaces of the retainer so that the force of the seal ring against the retainer urges the retainer against non-parallel regions of the wall of the seal cavity.

More specifically, the seal cavity is partially defined by the first and second members and these members are relatively movable to reduce the volume of the cavity and to compressively load and deform the seal ring so that the seal ring completely fills the cavity. The first and second members have non-parallel first and second surfaces, respectively, which extend generally transverse, usually at right angles, to each other in cross section and which define at least a portion of the wall of the seal cavity. The members also define at least one gap therebetween with the first and second surfaces being on opposite sides of the gap.

With the present invention, the gap is closed by a retainer which is engageable with both the first and second surfaces. The retainer has surface means responsive to the compressive loading of the seal ring for urging the retainer into tight engagement with both of the first and second surfaces. Accordingly, the retainer tightly closes the gap to prevent extrusion of the seal ring.

The retainer can be of different configurations within the scope of the present invention. For example, the surface means may be inclined in axial cross section relative to the axis of the seal ring. In this event, the surface means is preferably also inclined with respect to the surfaces of the retainer which engage the non-parallel annular wall regions of the seal cavity.

If the surface means is inclined, the retainer may be generally wedge shaped in axial cross section. If two gaps and two retainers are provided, the wedge-shaped retainers can be forced toward each other or may be moved in the same direction by one of the members. Each of the retainers is movable with one of the members and slidable with respect to the other of the members.

The retainers can be resilient or non-resilient. Theoretically all materials have resilience, i.e., an ability to elastically deflect under load. As used herein a nonresilient member is one that undergoes such minimal elastic deformation under normally encountered loads that it can be ignored. The wedge-shaped retainers are non-resilient. One advantage of non-resilient retainers is that substantially all of the force applied by the members can be used to deform the seal ring.

A preferred form of resilient retainer includes a base remote from the seal ring and a resilient arm affixed to the base and extending toward the seal ring. The base and the arm define a recess into which the arm can be resiliently deformed. One advantage of the resilient retainer is that the retainer can expand to take up any relaxation that may occur in the seal ring due, for example, to contraction of the contained sealing material caused by reduced temperatures. Another advantage of a resilient retainer is that, notwithstanding tolerances, it can maintain pressure on the sealing material when squeezing action is limited by an external stop.

In another form of this invention, the retainer includes first and second legs intersecting to define an interior angle of less than 180°. The retainer is arranged with the interior angle facing the seal ring. In a preferred construction, this retainer is generally L-shaped in axial cross section with the legs of the L-shaped retainer being urged against the non-parallel surfaces of the seal cavity.

Another advantage of the present invention is that it is readily acceptable to seal grooves of different constructions and configurations. Seal groove as used herein means that groove defined by the members into which the seal ring and retainers are spaced. For example, the gaps may be spaced axially radially, or axially and radially.

The invention can best be understood by reference to the following description taken in connection with the accompanying illustrative drawings.

DESCRIPTION OF THE PREFERRED EMBODIMENTS

Figure 1:
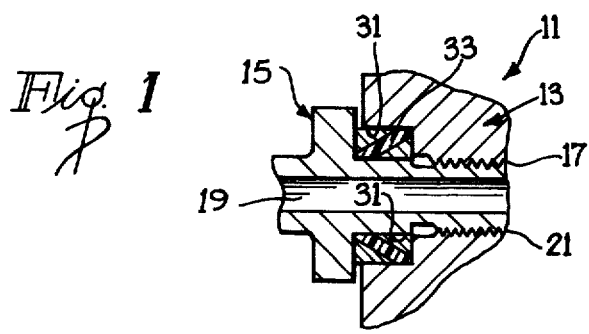
FIG. 1 is a fragmentary, sectional view of a threaded joint employing a captive sealing assembly constructed in accordance with the teachings of this invention.
Figure 2:
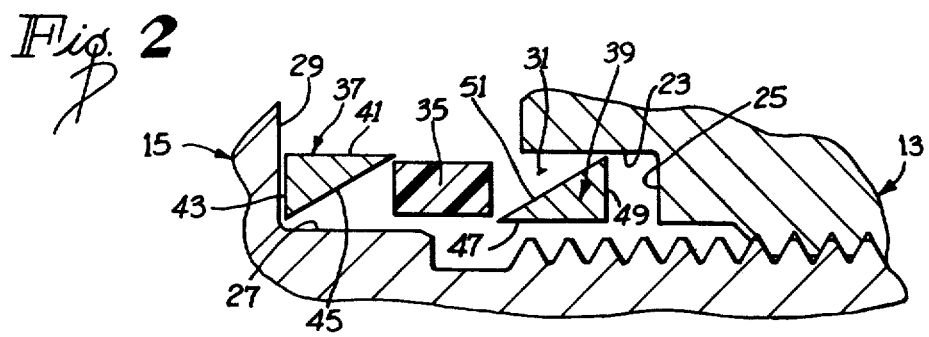
FIG. 2 is an enlarged, partially exploded, fragmentary, sectional view of the captive sealing assembly and portions of the two connector members adjacent the sealing assembly.
Figure 3:
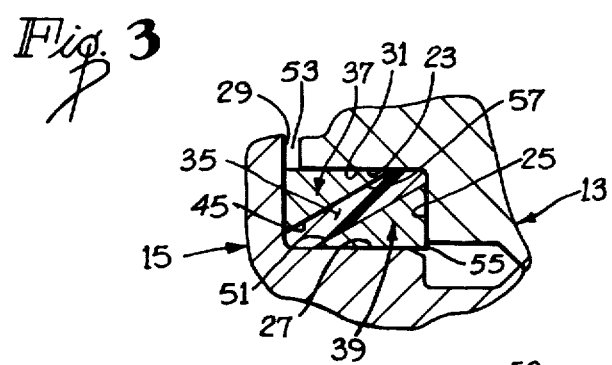
FIG. 3 is an enlarged, fragmentary, sectional view of the captive sealing assembly and the adjacent structure of the connector with the sealing assembly being under compression and in a sealing mode.

FIGS. 1–3 show a captive seal construction in the form of a threaded coupling 11 including coupling sections or members 13 and 15 suitably interconnected as by threads 17. Each of the coupling sections 13 and 15 may be suitably connected to other members such as conduits, containers, etc. The coupling section 15 has an axial passage 19 extending therethrough. The coupling section 13 has an opening 21 therein to allow insertion of a portion of the coupling section 15 therein. By relatively rotating the coupling sections 13 and 15, the coupling sections can be relatively advanced or retracted.

The coupling section 13 has a cylindrical surface 23 and an annular, radial surface 25 (FIG. 2) which intersect, in cross section, substantially at right angles to form an L-shaped configuration. The coupling section 15 has a cylindrical surface 27 and an annular, radial surface 29 which intersect substantially at right angles as viewed in axial cross section to form an L-shaped configuration. The cylindrical surfaces 23 and 27 are coaxial with the surface 27 being radially inwardly of the surface 23. The surfaces 25 and 29 are parallel and axially spaced. As shown in FIGS. 1 and 3, the surfaces 23, 25, 27, and 29 cooperate to define an annular seal groove 31. The volume of the seal groove 31 can be reduced by relatively advancing the coupling sections 13 and 15 to bring the radial walls 25 and 29 closer together.

An annular captive sealing assembly 33 is positioned in the seal groove 31. The captive sealing assembly includes a seal ring 35 and non-resilient retainers or retainer rings 37 and 39. Each of the retainers 37 and 39 is of wedge shaped cross section. The retainer 37 has a sliding surface 41, a driven surface 43, and an inclined surface 45. Similarly, the retainer 39 has a sliding surface 47, a driving surface 49, and an inclined surface 51. In the embodiment illustrated, each of the retainers 37 and 39 is in the form of a right triangle in axial cross section with the inclined surfaces 45 and 51 forming the hypotenuse. The retainers 37 and 39 are on opposite sides of the seal ring 35 and the inclined surfaces 45 and 51 are parallel and confront the seal ring. The inclined surfaces 45 and 51 are inclined relative to the axis of the seal ring 35.

The seal ring 35 may be of any material which is suitable for use in a captive seal. For example, such materials include elastomeric materials and various fluoroplastics, such as Teflon. The seal ring 35 must be deformable so that it can readily assume the shape of and completely fill the cavity in which it is positioned. In the embodiment illustrated, the seal ring 35 is rectangular in axial cross section; however, this is merely illustrative and should not be considered as limiting.

In use, the captive sealing assembly 33 is positioned in the seal groove 31 and the coupling sections 13 and 15 are relatively rotated to axially shrink this groove. Assuming that the coupling section 15 advances toward the coupling section 13, the radial surface 29 engages the driven surface 43 to drive the retainer 37 to the right as viewed in FIG. 2. The sliding surface 41 slides along the cylindrical surface 23 as the coupling section 15 is advanced. Simultaneously, the radial surface 25 engages the surface 49 to retain the retainer 39 in position. Ultimately, the seal ring 35 is engaged and squeezed between the inclined surfaces 45 and 51. As the coupling section 15 continues to advance, the seal ring 35 is placed under greater compressive load and it deforms.

Ultimately, the position shown in FIGS. 3 is reached. In this position the seal groove 31 is generally rectangular in cross section and the coupling sections 13 and 15 are spaced to define two gaps 53 and 55 at diagonally opposite corners of the rectangle. The retainers 37 and 39 extend across and close the gaps 53 and 55, respectively. The seal ring 35 is retained within an annular seal cavity 57 which is defined by portions of the surfaces 23, 25, 27, and 29 and by the inclined surfaces 45 and 51. The seal ring 35 completely fills the seal cavity 57 and is compressively loaded many times beyond its yield point so that the material of the seal ring flows into the minute crevices and surface irregularities of the surfaces defining the seal cavity 57.

Figure 3A:
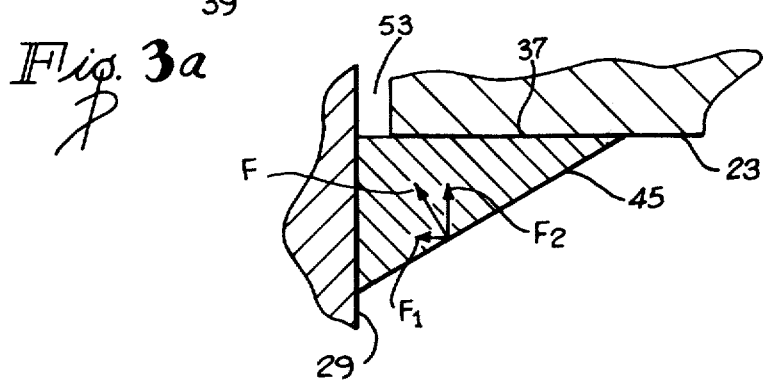
FIG. 3a is a schematic view showing how one of the retainers is urged against non-parallel surfaces on opposite sides of the gap.

The retainers 37 and 39 prevent extrusion of the highly compressively loaded seal ring 35 through the gaps 53 and 55, respectively. The gap 53 separated the surfaces 23 and 29 and the gap 55 separates the surfaces 25 and 27. The surfaces 41 and 43 of the retainer 37 engage the non-parallel surfaces 23 and 29, respectively, and the surfaces 47 and 49 of the retainer 39 engage the non-parallel surfaces 27 and 25, respectively. Tight engagement between these surfaces is necessary to prevent extrusion of the seal ring 35. This tight engagement is provided in the embodiment of FIGS. 1–3 by the inclined surfaces 45 and 51. As the inclined surfaces 45 and 51 compressively load the seal ring 35, the reaction force acting on the retainer 37 is perpendicular to the inclined surface 45 and in a direction generally toward the gap 53. Similarly, the reaction force on the retainer 39 is perpendicular to the inclined surface 51 and in a direction generally toward the gap 55. As shown in FIG. 3a, if the force acting perpendicular to the inclined surface 45 has a magnitude of F, then components of this force having magnitudes of $F_1$ and $F_2$ act to urge the retainer 37 toward the surfaces 29 and 23, respectively.

In the construction shown in FIGS. 1–3, the retainers 37 and 39 are generally opposed and are advanced toward each other as the coupling sections 13 and 15 are threaded together. The inclined surfaces 45 and 51 are parallel in axial cross section, although other orientations could be utilized. The captive sealing assembly 33 has application in environments other than that specifically disclosed in FIGS. 1–3.

Figure 4:
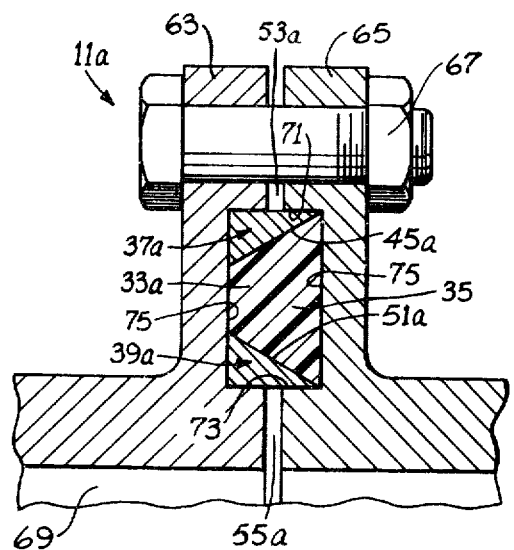
FIG. 4 is a fragmentary, axial sectional view of a flanged pipe joint employing a second form of captive sealing assembly constructed in accordance with the teachings of this invention. The captive sealing assembly is under compression and in a sealing mode.
Figure 5:
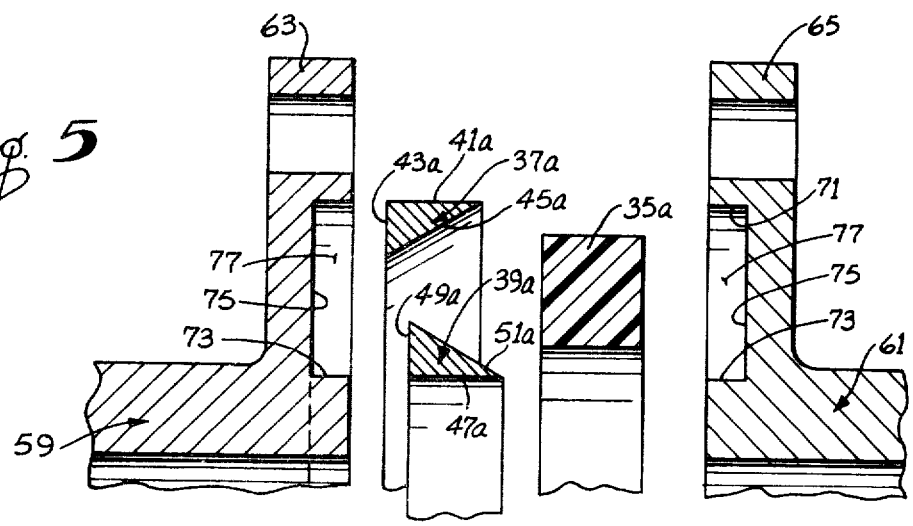
FIG. 5 is an exploded, fragmentary, sectional view of the construction shown in FIG. 4 with the fasteners for the flanges removed.

FIGS. 4 and 5 show a captive seal construction in the form of a flanged pipe coupling 11a. The coupling 11a employs a captive sealing assembly 33a which is similar to the captive sealing assembly 33 (FIGS. 1–3) except for the arrangement of non-resilient retainers 37a and 39a.

Specifically, the coupling 11a includes pipes or members 59 and 61 having radial flanges 63 and 65, respectively, which are adapted to be held together in any suitable manner such as by threaded fasteners 67 (only one being shown in FIG. 4). The pipes 59 and 61 define a fluid passage 69 extending therethrough.

The flange 63 has concentric cylindrical surfaces 71 and 73 interconnected by a radial surface 75 to form a channel-shaped groove 77 which opens toward the flange 65. The flange 65 has an identical groove 77 formed by identical and correspondingly numbered surfaces. With the flanges 63 and 65 bolted together as shown in FIG. 4, the grooves 77 are in confronting relationship and define a seal groove of rectangular cross section for the captive sealing assembly 33a. The flanges 63 and 65 are spaced or at least have an interface which defines annular, concentric, radially spaced gaps 53a and 55a.

The retainer 37a is identical to the retainer 37 (FIGS. 1–3) and the retainer 39a is a mirror image in cross section of the retainer 39. The surfaces of the retainers 37a and 39a are designated by numerals corresponding to the numerals used for the surfaces of the retainers 37 and 39 followed by the letter a. The seal ring 35a may be identical to the seal ring 35 except that the former is shown, by way of example, as being of square cross section.

In use, the captive sealing assembly 33 is positioned in the grooves 77 and the fasteners 67 are tightened to reduce the volume of the seal groove by moving the radial walls 75 toward each other. In addition, the radial wall 75 of the flange 63 engages the surfaces 43a and 49a to force the retainers 37a and 39a toward the flange 65. Ultimately, the seal ring 35a is engaged by the inclined surfaces 45a and 51a, and the surface 75 of the flange 65 and is compressed and deformed by these surfaces. The surfaces 41a and 47a slide as necessary along the cylindrical surfaces 71 and 73, respectively, of the flange 65 as the fasteners 67 are being tightened.

In the position shown in FIG. 4, the inclined surfaces 45a and 51a diverge as they extend axially to the right as viewed in FIG. 4. The retainers 37a and 39a span and close the gaps 53a and 55a. The radial surfaces 75 and the inclined surfaces 45a and 51a define a completely enclosed seal cavity for the seal ring 35.

The retainer 37a is held tightly against the cylindrical surface 71 of the flange 65 and against the radial surface 75 of the flange 63 by the forces acting on the inclined surface 45a resulting from the compressive loading and deforming of the seal ring 35a. Thus, each of the retainers 37a and 39a engages non-parallel surface regions of the flanges 63 and 65 on opposite sides of the gaps.

Figure 6:
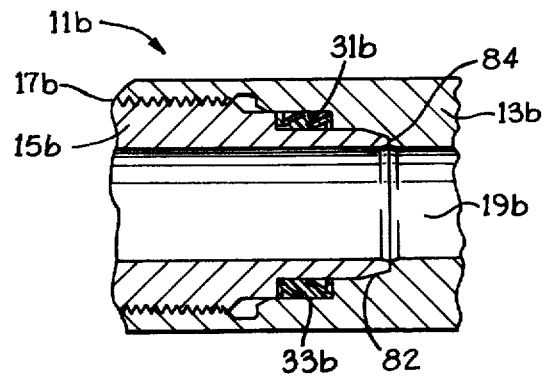
FIG. 6 is a fragmentary, sectional view of a threaded coupling employing a third form of captive sealing assembly constructed in accordance with the teachings of this invention.
Figure 7:
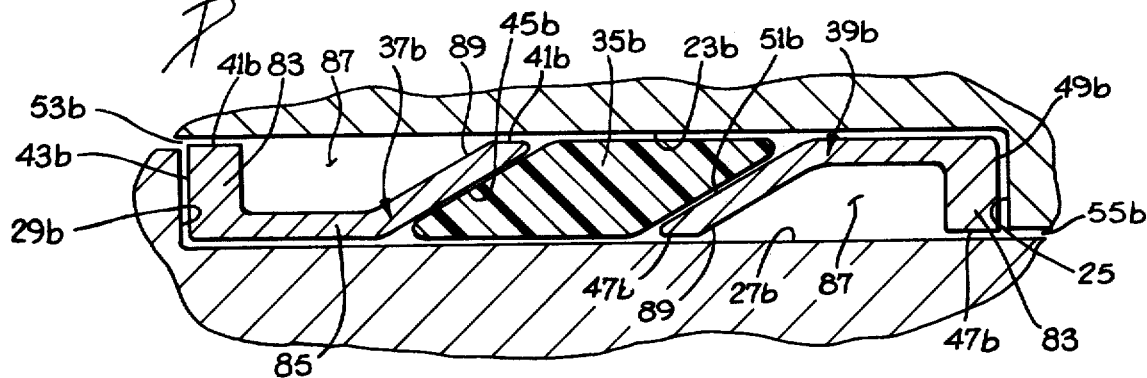
FIG. 7 is an enlarged, fragmentary, sectional view of the captive sealing assembly employed in FIG. 6 and of the adjacent coupling construction. The captive sealing assembly is in a relaxed condition.
Figure 8:
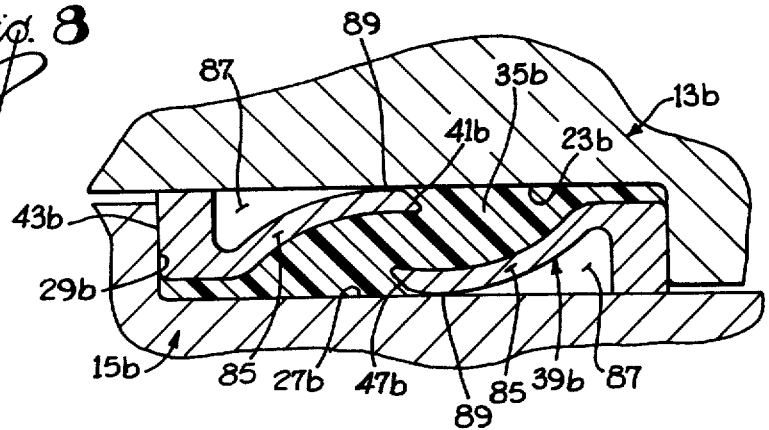
FIG. 8 is a fragmentary, sectional view similar to FIG. 7 with the captive sealing assembly being under compression and in a sealing mode.

FIGS. 6–8 show a captive seal construction in the form of a coupling 11b. The coupling 11b is similar to the coupling 11 (FIG. 1) and corresponding parts are designated by corresponding reference numerals followed by the letter b. The coupling 11b is substantially identical to coupling 11 in all respects not specifically shown or described herein.

The coupling 11b has coupling sections or members 13b and 15b interconnected by threads 17b with the coupling section 15b being partially insertable into the coupling section 13b. The coupling sections 13b and 15b define a seal groove 31b in which a captive sealing assembly 33b is positioned. The seal groove 31b is substantially identical to the seal groove 31 (FIGS. 1–3) except that the former is elongated. In addition, the cylindrical surface 23b extends axially beyond the radial surface 29b so that the gap 53b opens axially rather than radially. A shoulder 82 on the coupling section 13b cooperates with an end 84 of the coupling section 15b to define a stop for limiting relative advance of the coupling sections and the minimum volume of the seal groove 31b.

The captive sealing assembly 33b includes a seal ring 35b and retainers 37b and 39b. The seal ring 35b is identical to the seal ring 35 except the former has a cross-sectional configuration in the form of a parallelogram.

The retainers 37b and 39b differ from the retainers 37 and 39 in that they have a resilient portion. Specifically, the retainer 37b has a base 83 and a resilient leg 85 with the outer portion of the leg 85 being bent to define an inclined surace 45b. The base 83 has the surface 43b thereon and the base and a portion of the arm 85 define the sliding surface 41b. The sliding surface 41b includes two axially spaced portions. The base 83 and the arm 85 cooperate to define a recess 87 which opens radially outwardly. The retainer 39b is identically constructed except that it is turned around such that the recess 87 opens axially inwardly. The surfaces 45b and 51b are parallel prior to being loaded.

In use, the coupling sections 13b and 15b are relatively rotated to cause them to relatively advance. Assuming that the coupling section 15b advances towards the coupling section 13b, the surface 29b engages the surface 43b to move the retainer 37b to the right as viewed in FIGS. 7 and 8. Ultimately, the seal ring 35b is axially compressively loaded between the inclined surfaces 45b and 51b. As the coupling sections 13 and 15 relatively advance, the sliding surfaces 41b and 47b slide along the surfaces 23b and 27b, respectively.

With the coupling sections 13b and 15b advanced to the position shown in FIG. 8, three important conditions have occurred. First, the seal ring 35b is deformed so as to conform to the completely enclosed seal cavity defined by the members 13b and 15b and the retainers 37b and 39b, substantially as described with reference to the above described embodiments. Secondly, the arms 85 are resiliently deformed to reduce the volume of the cavities 87 as a result of compressively loading the seal ring 35b. One advantage of the resilient arms 85 is that should the seal ring 35b shrink or partially relax, the arms 85 expand or move toward the seal ring to take up this relaxation.

One additional effect of the resilience of the arms 85 is to change the portion of the arms which are in contact with the surfaces 23b and 27b. Specifically, in the fully compressed mode, a surface 89 of each of the arms 85 engages the surfaces 23b and 27b, respectively. FIG. 7 shows the location of the surfaces 89 prior to deformation of the arms 85.

Third, the inclined surfaces 45b and 51b operate to load the surfaces 43b, 89 and 49b, 89 against the confronting surface of the seal groove substantially as described hereinabove with reference to FIG. 3a. The inclined surfaces 45b and 51b are inclined relative to the axis of the seal ring 35b.

Figure 9:
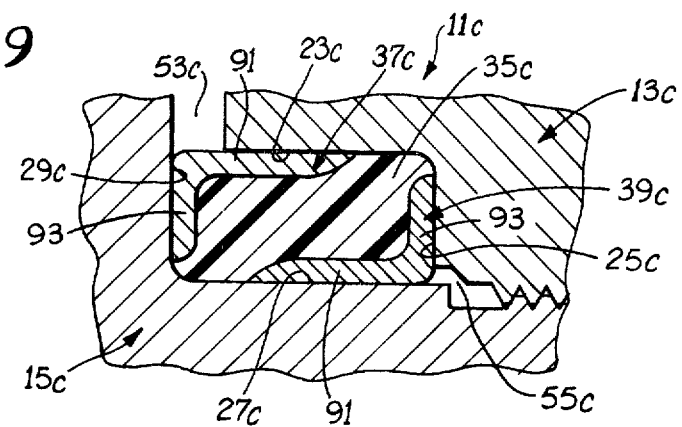
FIG. 9 is a fragmentary, sectional view of a threaded coupling employing a fourth form of captive sealing assembly constructed in accordance with the teachings of this invention. The captive sealing assembly is under compression and in a sealing mode.

FIG. 9 shows a captive seal construction in the form of a coupling 11c which is substantially identical to the coupling 11 in all respects not specifically described herein. Portions of the coupling 11c corresponding to portions of the coupling 11 are designated by corresponding reference numerals followed by the letter c.

The primary difference between the coupling 11c and the coupling 11 is in the configuration of the retainers 37c and 39c. Each of the retainers 37c and 39c includes a cylindrical section or leg 91 and a radial section or leg 93 integrally joined to the cylindrical section to provide an L-shaped cross section with the L opening toward the seal ring 35c. The cylindrical sections 91 are coaxial with each other and with the axis of the seal ring 35c, and the radial sections 93 lie in parallel, axially spaced planes which are perpendicular to the axis of the seal ring 35c.

In use, the coupling sections 13c and 15c are relatively advanced to move the retainers 37c and 39c axially toward each other. The retainers 37c and 39c span and close the gaps 53c and 55c, respectively. The seal ring 35c is compressively loaded and deformed by the coupling sections 13c and 15c and the retainers 37c and 39c. The reaction force from compressively loading the seal ring 35c acts on the sections 91 to urge them radially against the surfaces 23c and 27c, respectively. Similarly, the reaction forces from compression of the seal ring 35c act on the radial legs 93 to urge them axially outwardly and into tight sealing engagement with the surfaces 29c and 25c. Thus, the sections 91 and 93 of the retainer 37c are urged into tight sealing engagement with the surfaces 23c and 29c on the opposite sides of the gap 53c even though the retainer has no inclined surface. The retainer 39c is similarly loaded against the surfaces 25c and 27c.

Although exemplary embodiments of this invention have been shown and described, many changes, modifications and substitutions may be made by one having ordinary skill in the art without necessarily departing from the spirit and scope of this invention.

I claim:

1. A captive sealing assembly comprising:
a seal ring of deformable sealing material;
first and second retainer rings positionable in engagement with said seal ring on opposite sides thereof;
each of said retainer rings having an inclined surface confronting the seal ring, each of said inclined surfaces being inclined in cross section with respect to the axis of the seal ring;
each of said retainer rings being sufficiently stiff to be capable of deforming said seal ring; and
at least one of said retainer rings including a base remote from said seal ring and a resilient arm integral with said base and projecting toward said seal ring, said resilient arm including an inclined section defining at least a portion of said inclined surface of said one retainer ring, said arm and said base defining a recess into which the arm can be resiliently deformed.

2. A sealing assembly as defined in claim 1 wherein said inclined surfaces of said retainer rings are substantially parallel at least when the sealing assembly is in a relaxed condition.

3. A captive sealing assembly comprising:
a seal ring of deformable sealing material;
first and second retainer rings positionable in engagement with said seal ring on opposite sides thereof;
each of said retainer rings having an inclined surface confronting the seal ring, each of said inclined surfaces being inclined in cross section with respect to the axis of the seal ring;
each of said retainer rings being sufficiently stiff to be capable of deforming said seal ring; and
at least one of said retainer rings including a base remote from said seal ring and a resilient arm projecting toward said seal ring, said resilient arm including an inclined section defining at least a portion of said inclined surface of said one retainer ring, said base and said arm cooperating to define a recess into which the arm can be resiliently deformed.

4. A seal construction as defined in claim 3 wherein said seal ring is constructed of a fluoroplastic material.

* * * * *